Patented Feb. 10, 1953

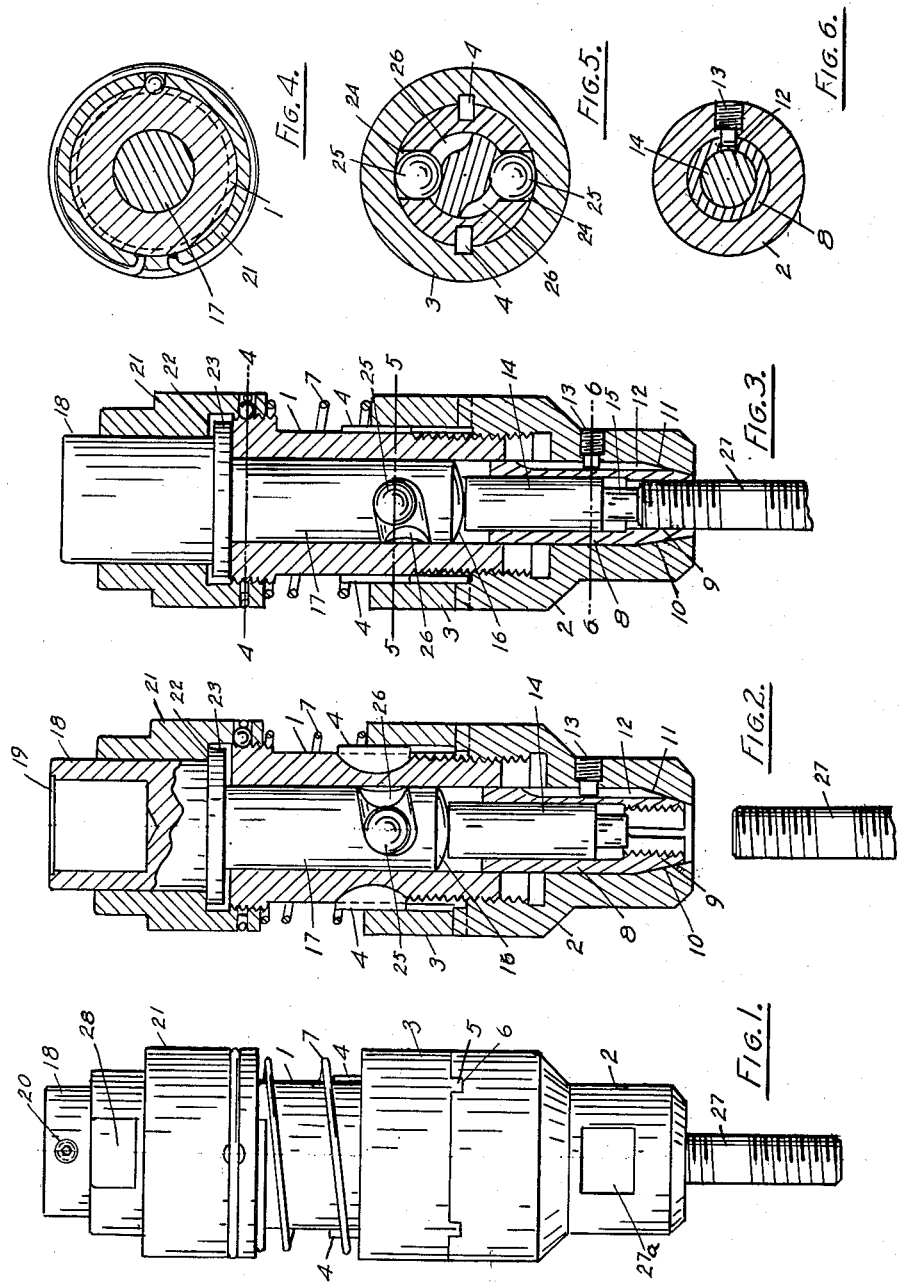

2,628,105

UNITED STATES PATENT OFFICE 2,628,105

STUD DRIVER

Boyd A. McKean, Erie, Pa., assignor to Titan Tool Company, Fairview, Pa., a corporation of Pennsylvania Application November 14, 1950, Serial No. 195,503

4 Claims. (Cl. 279—58)

In stud drivers it is desirable that the threads of the stud be firmly gripped so as to prevent mutilation and scraping as the stud is driven. This invention is intended to provide such a driver in which a collet type clutch is used to grip the threads. Features include an adjustment for the depth of grip on the stud and a ball and cam slot release for the clutch. Further objects and advantages appear in the specification and claims.

In the drawings, Fig. 1 is a side elevation of the driver, Fig. 2 is a section showing the parts in the position prior to driving, Fig. 3 is a section showing the parts at the driving position, and Figs. 4, 5 and 6 are sections on the correspondingly numbered lines in Fig. 3.

In the drawing, 1 indicates a hollow cylindrical body having threaded on its lower end a collet type clutch holder 2. The clutch holder 2 is adjustable lengthwise of the body by threading in and out along its length and is held in the adjusted position by a locking ring 3 keyed to the body by keys 4 and having clutch teeth 5 which are urged into corresponding knotches 6 in the clutch holder by a compression spring 7. The purpose of adjusting the clutch holder 2 lengthwise of the body 1 is to control the depth of grip on an inserted stud as will hereinafter appear. Slidably and non-rotatably carried in the clutch holder 2 is a spring collet type clutch 8 having split internally threaded jaws 9 having a normal inside diameter greater than a stud and having tapered cam surfaces 10 which cooperate with correspondingly tapered cam surfaces 11 on the clutch holder to wedge the jaws together as the clutch is moved axially outward in the clutch holder. The wedging of the jaws together produces the desired firm grip for driving a stud preventing mutilation or scraping of the threads. The position of the clutch before the start of the stud driving operation is illustrated in Fig. 2. In this position the jaws 9 are slightly spread apart so that a stud may be easily threaded into the jaws. In the driving position, illustrated in Fig. 3, the clutch 8 has moved outward in the clutch holder 2 and the jaws 9 have been wedged together to tightly grip the threads of the stud.

The clutch 8 can be easily removed from the clutch holder 2 by unthreading the clutch holder off the lower end of the body. The clutch then freely slides out the open upper end of the clutch holder and can be renewed or replaced by merely dropping it in the clutch holder. A slot 12 which engages the inner end of a set-screw 13 threaded in the clutch holder locates the clutch in the holder and provides for the necessary axial sliding of the clutch relative to the holder to grip and release the threads of a stud.

The gripping action of the clutch is effected by means of a stop pin 14 slidably and rotatably carried in the clutch and having a lower end 15 of reduced diameter for engaging the upper end of an inserted stud. The reduced diameter of the lower end 15 of the stop pin restricts the engagement of the stop pin to the central portion of the stud well within the root diameter of the threads. The upper end of the stop pin 14 extends within the bore of the body 1 and engages the domed lower end 16 of the stem 17 of a driving member 18. The upper end of the driving member extends above the body 1 and is provided at 19 with a recess for receiving a driving spindle which is suitably secured therein for example by a set screw 20. The driving member is held on the body by a sleeve 21 threaded on the upper end of the body and having an inwardly extending shoulder 22 overlapping the upper surface of a collar 23 on the driving member. The collar 23 overlaps the upper end of the body 1 and the shoulder 22 in the driving position is spaced from the upper end of the body 1 a distance greater than the thickness of the collar 23 so that the driving member is free to move axially relative to the body 1. In the body 1 are diametrically opposed holes 24 in the region normally covered by the locking ring 3 in which are recessed balls 25 of greater diameter than the wall thickness of the body. As shown in Fig. 4, the balls 25 project into the bore of the body and are received in inclined cam slots or grooves 26 in the stem 17 of the driving member. The balls 25 and cam slots 26 cooperate to move the driving member in and out relative to the body 1 as the driving member is rotated relative to the body. This inward and outward movement of the stem 17 of the driving member is utilized to advance and retract the stop pin 14 and to thereby control the gripping action of the jaws 9 on the threads of the stud.

At the start of the stud driving operation, the driver normally occupies the position shown in Fig. 2 in which the driving member 18 is at rest and a stud 27 is ready to be threaded into the driver. After threading the stud into the jaws 9, the driving member 18 is rotated in a forward direction (the direction to drive the stud). Because of the ball and cam slot connection 25, 26 between the driving member and the body 1, the body 1 does not turn as soon as the rotation of the driving member starts. It is necessary that the lost motion provided by the ball and cam slot connection be taken up before the body 1 rotates with the driving member. While this lost motion is being taken up, the stem 17 of the driving member is advanced by the ball and cam slot connection moving the stop pin 14 axially outward with respect to the clutch holder 2. The engagement of the reduced lower end 15 of the stop pin 14 with the upper end of the stud 27 limits the inward movement of the stud with respect to the clutch holder. Since the stud cannot move inward with respect to the clutch holder 2 further than the distance permitted by the stop pin 14, turning of the stud relative to the jaws 9 of the clutch 8 results in an axially outward movement of the clutch 8 with a corresponding forcing of the jaws 9 together by the engagement of the tapered surfaces 10 and 11. This produces the desired gripping action on the threads and studs which prevents mutilation or scraping during the driving operation. At the end of the driving operation when the stud has been driven to the desired depth, it is desirable that the gripping action of the jaws 9 on the threads of the stud be quickly released so that the stud driver may be unthreaded from the stud without removing the same. This is accomplished by reversing the driving member so that it rotates in the reverse direction (direction to unthread the stud). At the start of the reverse rotation of the driving member, the angular lost motion provided by the ball and cam slot connection 25 and 26 causes the driving member to rotate reversely with respect to the body 1. Due to the inclination of the cam slots 26, this results in a retraction of the stem 17 of the driving member and a release of the pressure exerted by the domed lower end 16 on the upper end of the stop pin 14. Upon release of the pressure on the upper end of the stop pin, the clutch 8 slides upward in the clutch holder 9 and the jaws 9 expand under the inherent resilience so as to no longer grip the threads of the stud. The angular lost motion of the driving member 18 with respect to the body 1 accordingly is utilized to quickly relieve the gripping of the jaws on the stud upon reverse rotation of the driving member so that the stud driver can be unthreaded without removing the stud. Because of the lack of friction between the ball and cam slot connection 25, 26, both the gripping and relieving action is effected with a very small amount of torque. This is important, not only in the driving of the studs, but also in the unthreading of the studs. If the torque required to relieve the clamping or gripping pressure of the jaws 9 approached the torque required to unthread the stud, there would be danger of unthreading the stud as the driving member was reversely rotated.

When the stud driver is used for driving studs it is necessary that the sleeve 21 be so positioned on the body 1 that the clearance between the shoulder 22 of the sleeve and the upper end of the body is sufficiently greater than the thickness of the collar 23 as to permit the necessary axial movement of the driving member as the balls 25 move from one end to the other of the inclined cam slots 26. It is, however, possible to use the stud driver for removing studs by taking up the clearance. In removing studs, the driver is threaded onto the stud and the driving member 18 is rotated forwardly until the stud turns slightly. This tends to break the seal between the threads and the casting into which the stud is threaded. While still maintaining the driving torque on the driving member 18, the sleeve 21 is then screwed down on the body 1 until the collar 23 is tightly clamped against the upper end of the body 1. This removes the clearance permitting the axial movement of the driving member in the body, and since the driving member cannot move upwards, the grip of the jaws 9 on the threads of the stud is maintained and the stud can be backed out of the casting upon reverse rotation of the driving member. When the stud is completely unthreaded from the casting it will still be firmly gripped in the jaws 9. The stud can be released by placing a wrench on the wrench surfaces 27a on the clutch holder 2 and on wrench surfaces 28 on the sleeve 21 and unthreading the sleeve 21 so as to provide the necessary clearance for the collar 23. As soon as the sleeve 21 is released, the stud will be free in the jaws 9 and can be unscrewed by hand.

What I claim as new is:

1. A stud driver comprising a body, a clutch holder on the body, means for adjusting the clutch holder lengthwise of the body to any one of a plurality of fixed positions, a clutch slidably and non-rotatably mounted in the holder, said clutch having interiorly threaded jaws and said holder and jaws having cam surfaces wedging the jaws together as the clutch is moved outward relative to the holder, stop means slidably carried in the body limiting the inward movement of a stud threaded in the jaws, a driving member having an angular lost motion connection with the body, said angular lost motion connection including cam means advancing and retracting the driving member relative to the body as the driving member is rotated in forward and reverse directions, and a part advanced and retracted with the driving member cooperating with the stop means to position the same.

2. A stud driver comprising a body, a clutch holder threaded on the body for movement lengthwise thereof, a locking ring slidable and non-rotatable on the body and biased toward the clutch holder, interengaging stops on the clutch holder and locking ring non-rotatably holding the clutch holder in any one of a plurality of positions on the body, a clutch slidably and non-rotatably mounted in the holder, said clutch having interiorly threaded jaws and said holder and jaws having cam surfaces wedging the jaws together as the clutch is moved outward relative to the holder, stop means slidably carried in the body limiting the inward movement of a stud threaded in the jaws, a driving member having an angular lost motion connection with the body, said angular lost motion connection including cam means advancing and retracting the driving member relative to the body as the driving member is rotated in forward and reverse directions, and a part advanced and retracted with the driving member co-operating with the stop means to position the same.

3. A stud driver comprising a body, a clutch holder thereon, a clutch slidably and non-rotatably mounted in the holder, said clutch having interiorly threaded jaws and said holder and jaws having cam surfaces wedging the jaws together as the clutch is moved outward relative to the holder, stop means slidably carried in the body limiting the inward movement of a stud threaded in the jaws, a ball recessed in the body, a driving member rotatable in the body having a cam slot receiving the ball and inclined circumferentially to advance and retract the driving member relative to the body as the driving member is rotated in forward and reverse directions, and a part advanced and retracted with the driving member co-operating with the stop means to position the same.

4. A stud driver comprising a hollow body, a clutch holder thereon, a clutch slidably and non-rotatably mounted in the holder, said clutch having interiorly threaded jaws and said holder and jaws having cam surfaces wedging the jaws together as the clutch is moved outward relative to the holder, a stop pin slidable in the body for limiting the inward movement of a stud threaded in the jaws, a driving member having a collar co-operating with the end of the body, and having a stem slidable and rotatable in the body and co-operating with the stop pin to position the same, a ball recessed in the body, a cam slot in the stem of the driving member and inclined circumferentially to advance and retract the driving member relative to the body as the driving member is rotated in forward and reverse directions, the collar engaging the end of the body when the driving member is rotated forward and being spaced from the end of the body when the driving member is rotated backward relative to the body, and means for clamping the collar against the end of the body to prevent retraction of the stop pin upon reverse rotation of the driving member to remove studs.

BOYD A. McKEAN.

REFERENCES CITED

The following references are of record in the file of this patent:

UNITED STATES PATENTS

| Number | Name | Date |
| --- | --- | --- |
| 339,595 | Stone | Apr. 6, 1886 |
| 1,807,264 | Walker | May 26, 1931 |
| 1,807,265 | Walker | May 26, 1931 |
| 2,118,485 | Brown | May 24, 1938 |

FOREIGN PATENTS

| Number | Country | Date |
| --- | --- | --- |
| 381,033 | France | Oct. 26, 1907 |